United States Patent
Patwardhan (10) Patent No.: US 9,043,280 B1
(45) Date of Patent: May 26, 2015

(54) SYSTEM AND METHOD TO REPAIR FILE SYSTEM METADATA

(75) Inventor: Kedar Patwardhan, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 128 days.

(21) Appl. No.: 13/209,791

(22) Filed: Aug. 15, 2011

(51) Int. Cl.
*G06F 7/00* (2006.01)
*G06F 17/00* (2006.01)
*G06F 11/14* (2006.01)

(52) U.S. Cl.
CPC .................................. *G06F 11/1446* (2013.01)

(58) Field of Classification Search
CPC .................................................. G06F 11/1446
USPC ........................................................... 707/640
See application file for complete search history.

(56) References Cited

U.S. PATENT DOCUMENTS

| | | | |
|---|---|---|---|
| 7,093,086 B1* | 8/2006 | van Rietschote | 711/161 |
| 7,487,228 B1* | 2/2009 | Preslan et al. | 709/219 |
| 7,610,387 B1* | 10/2009 | Liskov et al. | 709/227 |
| 7,966,293 B1* | 6/2011 | Owara et al. | 707/654 |
| 8,010,509 B1* | 8/2011 | Khurana et al. | 707/690 |
| 2008/0168108 A1* | 7/2008 | Molaro et al. | 707/202 |
| 2009/0070367 A1* | 3/2009 | Xu et al. | 707/102 |

* cited by examiner

*Primary Examiner* — Charles Lu
(74) *Attorney, Agent, or Firm* — Campbell Stephenson LLP (57) ABSTRACT

A system and method for repairing potentially corrupt file systems are provided. A request to repair an original file system, including a current set of metadata, is received. A metasave image is accessed, in response to the request. The metasave image includes a copy of the metadata included in the original file system at a point-in-time and information identifying a location of each block of metadata in the metasave image. Using the metasave image information, the current set of metadata in the original file system is replaced with the metadata in the metasave image.

21 Claims, 7 Drawing Sheets

SYSTEM AND METHOD TO REPAIR FILE SYSTEM METADATA

FIELD OF THE INVENTION

This invention relates to file systems and, more particularly, to repairing potentially corrupt file systems.

DESCRIPTION OF THE RELATED ART

A file system organizes data into files and folders. Over time, a file system may develop errors, such as multiple files being erroneously identified as containing the same data block or multiple, inconsistent views of the file system hierarchy being presented. A file system can develop errors due to causes like hardware failures, disk block corruption, a power outage, poor system maintenance, a virus, and/or human error. Whenever a file system develops errors, the file system is typically analyzed to discover and repair such errors (e.g., via a file system check operation).

Unfortunately, a file system check operation can be a lengthy and unpredictable operation. This is because the time needed to repair a file system is dependent upon the number of errors in the file system and/or the complexity of the errors and can often exceed the amount of time considered by users to be reasonable. In addition, information regarding the number of errors and/or the level of complexity of such errors is typically unknown whenever a file system check operation is started. This type of information is usually not discovered until each file system error is detected and analyzed. This in turn can lead to user frustration, since file system check operations can be both time consuming and unpredictable.

SUMMARY OF THE INVENTION

Various systems and methods for repairing potentially corrupt file systems are disclosed. For example, one method involves a file system repair module receiving a request to repair an original file system. The original file system includes a current set of metadata at the time the request to repair is received. In response to the request, the file system repair module accesses a metasave image. The metasave image includes a copy of the metadata included in the original file system at a point-in-time and further includes information identifying a location of each block of metadata in the metasave image. Using the metasave image, the file system repair module replaces the current set of metadata of the original file system with the metadata included in the metasave image.

The method may also involve generating the metasave image. In one embodiment, information identifying changes to the original file system is also generated. The changes identified are changes occurring after the creation of the metasave image and can be recorded in a change log.

Another example method involves generating an updated metasave image. The updated metasave image is generated by replaying the changes to the original file system on the metasave image, according to a set of criteria.

In one embodiment, the request to repair the original file system specifies a point-in-time. The metasave image is then selected from a set of metasave images based upon the point-in-time specified in the request to repair the original file system.

In another embodiment, the replacement of metadata in the original file system includes removing a metadata block from the current set of metadata, when the metadata block is not included in the metasave image.

An example of a system can include one or more processors and memory coupled to the processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents, and alternatives falling within the spirit and scope of the invention defined by the appended claims.

DETAILED DESCRIPTION

Figure 1:
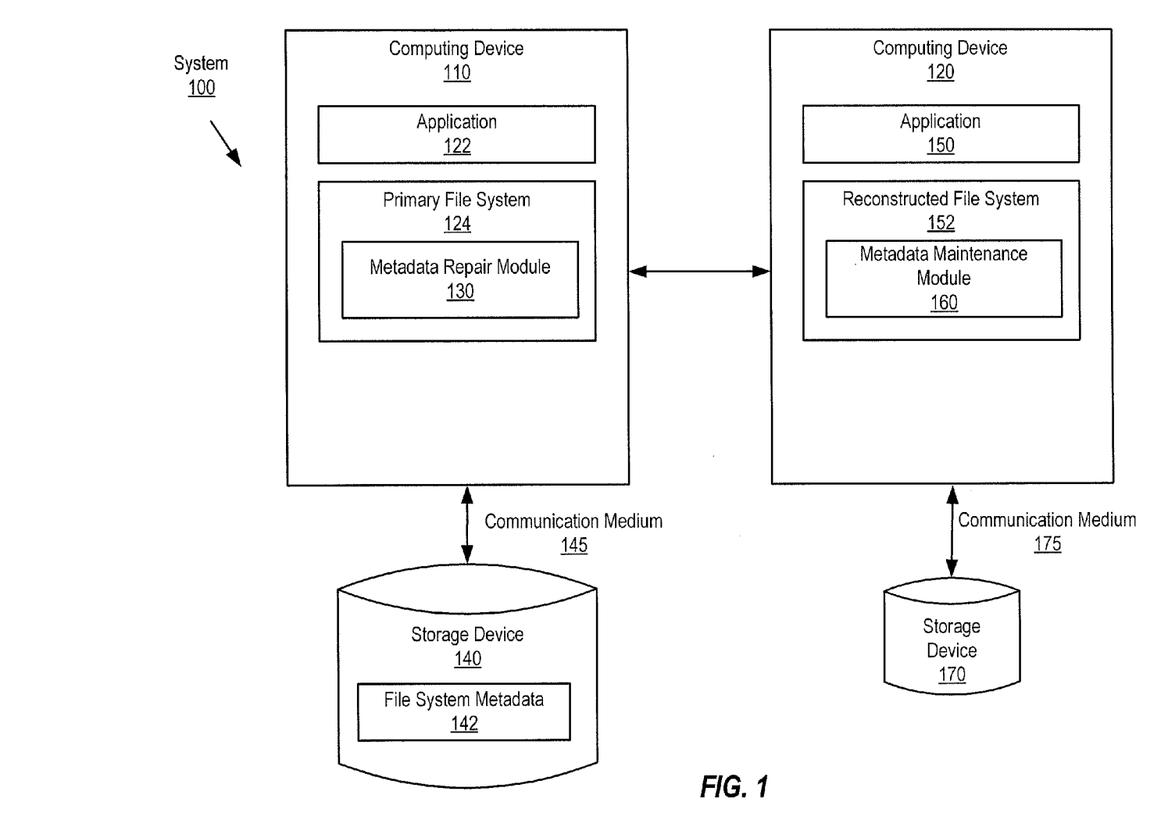
FIG. 1 is a block diagram showing a system for repairing a file system, according to one embodiment of the present invention.

The system of FIG. 1 provides a system for repairing a file system, whenever the file system is suspected to be corrupt. The system of FIG. 1 may, in at least some embodiments, significantly reduce the total amount of time needed to repair a file system, especially relative to repairs performed by implementing a traditional file system check operation (e.g., a full-fsck operation in the VERITAS™ File System). This is because in the system of FIG. 1, any potentially damaged metadata blocks within a file system are simply replaced (e.g., by being overwritten) with non-damaged metadata blocks. In contrast, traditional file system check operations typically analyze each item of metadata and make repairs to these individual items as errors are detected during the analysis. Each repair may potentially reveal another error, and thus the analysis of the individual metadata items often needs to be restarted each time a repair is made.

By replacing the file system's metadata with a known-good copy of the file system's metadata, the amount of time needed to repair a file system becomes dependent upon the number of metadata blocks contained within the file system, and not upon the number of errors within the file system's metadata and/or the complexity of the errors detected within the file system's metadata. Thus, the amount of time needed to repair a file system becomes more predictable given that, in at least some embodiments, the maximum amount of time needed would be the amount of time needed to overwrite all of the metadata blocks of a file system.

FIG. 1, as illustrated, shows a system 100 for repairing a file system by maintaining a known-good copy of the file system's metadata that can be used to replace the file system's metadata under certain circumstances (e.g., if corruption of the file system is suspected). As shown, system 100 includes two computing devices 110 and 120.

Computing device 110 includes an application 122 and a primary file system (which further includes a metadata repair module 130). Client 110 communicates with storage device 140 via communication medium 145. Client 110 also communicates with computing device 120. Computing device 120 includes an application 150 and a reconstructed file system 152 (which further includes a metadata maintenance module 160). Computing device 120 communicates with storage device 170 via communication medium 175.

Computing devices 110 and 120 can be any type of computing device, such as a desktop, a laptop computer, a telephone, a portable computing device, a server, and so on. Applications 122 and 150 are executed by computing devices 110 and 120, respectively. These applications access data via respective file systems. The applications can generate and/or consume data organized by the file systems. Examples of applications include word processing applications, spreadsheet applications, email clients, web browsers, database applications, graphics editing applications, and the like.

Primary file system 124 organizes data into files and/or folders (e.g., special files that can contain additional files and/or folders) and allow applications like applications 122 and 150 to access the organized data. This data can be stored within storage device 140. Typically, application 122 views the data as files and folders presented by primary file system 124. Primary file system 124 thus provides the organization for application 124 to find, retrieve, access, and modify data within primary file system 124. Primary file system 124 can use one of several possible file system formats for organizing data into files and folders. Examples of file system formats include File Allocation Table (FAT), New Technology File System (NTFS), Hierarchical File System (HFS), High-Performance File System (HPFS), Unix File System (UFS), Veritas File System (VxFS), and the like. Primary file system 124 maintains file system metadata 142, which describes the files organized by the file system, within storage device 140. File system metadata 142 includes, for example, inode contents, filename information, and the like.

Reconstructed file system 152 is a point-in-time copy of primary file system 124, as reconstructed on computing device 120, that only includes metadata. A copy of some or all metadata blocks within primary file system 124 is made and saved (e.g., as a data structure that is referred to herein as a metasave image), along with information identifying the location of each of the copied metadata blocks within the file system, at a particular point in time. This copy includes only metadata (e.g., inode contents, filename information, and the like) and does not include any user (e.g., application) data. This information can be saved as a file or other object within storage device 140, another storage device coupled to computing device 110 (not shown), reconstructed file system 152, and/or storage device 170. Using this information, reconstructed file system 152 is created by taking the metasave image information (e.g., the file names and directories of primary file system 124) to recreate primary file system 124 as reconstructed file system 152.

As primary file system 124 undergoes changes (e.g., to primary file system 124's configuration, to the organization of files managed by primary file system 124, and/or to the contents of those files), these changes can be tracked and recorded. These changes can be tracked and recorded, for example, by storing information identifying each change in a log, a journal, or other list of changes maintained by primary file system 124. The information stored for each change can include information indicating the time at which the change took place or was requested, the type of change (e.g., modification, deletion, creation, renaming, or the like), the file system object affected by the change (e.g., in terms of the location of the file system object, the file system object's name or other identifier, an inode identifier or other identifier associated with metadata for the file system object), and the like. In some circumstances, the information can also identify a value of the object before and/or after the change.

In some embodiments, the log or journal used to track changes to the metadata is used by many file system components and/or other applications. For example, the log or journal can be an intent log, a file change log, a pending change log, or the like. Similarly, the changes can be tracked using a data structure (e.g., such as a bitmap) that also tracks changes for the purpose of replication or generating incremental backups.

After a certain time period or after a certain preconfigured criteria (e.g., provided by an administrator via a user interface) is met, the information associated with the changes that were tracked and recorded can be used to generate an updated metasave image. One way to do this is to transfer the information associated with the changes to reconstructed file system 152 (e.g., via a network). For example, primary file system 124 can send information indicating the tracked changes to reconstructed file system 152 whenever a log of changes becomes reaches half (or another threshold) of its capacity (e.g., if the log contains space for 1000 entries, the log is half full when it reaches 500 valid entries), whenever a certain number of changes are made (e.g., as determined by a preconfigured threshold number of changes), or whenever a certain time period has elapsed (e.g., every X number of minutes, hours, or days). In some embodiments, the information can be transferred in response to detecting that another file system component (e.g., a backup module or replication module) is about to clear all or some of the information from the log or other data structure. The information indicating the changes may also be transferred in response to a receiving a request to perform such a transfer (e.g., from an application or administrator).

Once the information identifying the changes has been transferred to the reconstructed file system (e.g., as determined by receiving an acknowledgement from the reconstructed file system), the primary file system can reset its tracking mechanism (e.g., if tracking the capacity of a log, the primary file system can reset the used capacity to zero; if tracking the number of changes, the primary file system can reset the number to zero), taking into account any changes that have been tracked subsequent to time at which the transfer was initiated and prior to the time that the transfer completed (e.g., if two changes were tracked during this interval, the primary file system would reset its log capacity to two valid entries instead of zero). The entries that were transferred can be overwritten, reused, deleted, or the like.

Once the information indicating these changes has been received by reconstructed file system 152, reconstructed file system 152 reads the information and uses it to replay the changes on the original metasave image to create an updated metasave image. The updated metasave image can then be stored (e.g., within reconstructed file system 152 or storage device 170) with an associated timestamp. The information within the updated metasave image can then be used to construct an updated reconstructed file system 152.

Replaying the changes can involve overwriting any portions of the metadata that were modified by the changes as well as inserting any new blocks of metadata that were created by the changes. Additionally, if any metadata blocks were deleted by the changes, those metadata blocks can be removed. The resulting metasave image, to which the changes have been applied, can then be saved as the most recent metasave image.

In some embodiments, multiple metasave images are maintained, such that each represents the state of the file system's metadata at a respective point in time (in such embodiments, information identifying that point in time can be associated with each image). In other embodiments, only the most recent metasave image is maintained. The most recent metasave image will, in at least some embodiments, lag behind the state of primary file system 124. The amount of time between the current state of the primary file system 124 and the state of the most recent metasave image may, in some embodiments, be configured by an administrator.

By having one or more metasave images, reconstructed file system 152 provides at least one non-damaged copy of the metadata blocks within primary file system 124 at a particular point in time. Such a copy can be used to replace damaged metadata blocks within primary file system 124 as part of a file system repair operation.

Metadata repair module 130 and metadata maintenance module 160 work together to perform a file system repair operation that replaces potentially damaged metadata blocks with non-damaged metadata blocks from the reconstructed file system. Metadata repair module 130 operates in response to receiving a request to perform a file system repair operation. Such a request can be received, from a user, administrator, or application that suspects that the file system is corrupt (e.g., in response to encountering an error when attempting to access a file via the file system). This file system repair operation can be presented as a quicker alternative to a traditional file system check operation. In a file system repair operation, the file system's metadata is effectively restored to a prior point in time. Unlike a traditional file system check operation, the file system repair operation is performed without the need to analyze the file system metadata.

When a file system repair operation is requested, metadata repair module 130 replaces primary file system 124's potentially corrupt metadata with the metadata stored in reconstructed file system 152. This replacement is performed by reading each metadata block in reconstructed file system 152 and writing that metadata block to primary file system 124. Thus, any metadata blocks that have values that differ will be overwritten with the value from reconstructed file system 152. Similarly, any metadata blocks that are included within reconstructed file system 152 will be copied to primary file system 124, even if those metadata blocks were not included within primary file system 124 at the time the file system repair was requested. Additionally, any metadata blocks that are not present in reconstructed file system 152 will be removed from primary file system 124.

While the above example shows a scenario in which the metasave image(s) are maintained by a secondary computing device, in other embodiments one or more metasave images may be maintained by the primary computing device. For example, in one embodiment, computing device 110 can maintain the most current metasave image in storage device 140. Instead of transferring information identifying changes to a remote computing device, computing device 110 can simply apply the changes to the metasave image in storage device 140 itself.

As noted above, in some embodiments, multiple metasave images may be maintained. In such an embodiment, a request to perform a file repair operation may indicate a particular point in time. In response to such a request, metadata repair module 130 can select the appropriate metasave image that represents the state of primary file system 124's metadata at the specified point in time, cause that metasave image to be mounted as a reconstructed file system, and then copy the metadata from the reconstructed file system as described above.

Storage devices 140 and 170 provide data storage for computing devices 110 and 120. Each of storage devices 140 and 170 can include one or more storage media, such as hard disks, compact discs (CDs), digital versatile discs (DVDs), magnetic tapes, solid state memory, or the like. Additionally, storage device 140 and/or 170 may include an array of such storage media, such as a just a bunch of disks (JBOD) array, a redundant array of independent disks (RAID), a DVD/CD jukebox, a tape libaray, and other types of media.

Communication mediums 145 and 175 provide a communication path from computing devices 110 and 120 to storage devices 140 and 170, respectively. Communication mediums 145 and 175 can include any type of communications link, bus, and/or network, such as an intranet, a wide area network (WAN), a local area network (LAN), a personal area network (PAN), or the Internet.

Figure 2:
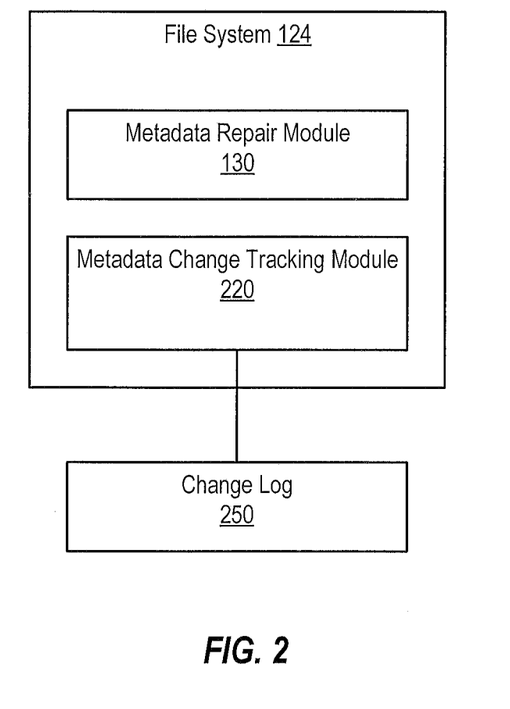
FIG. 2 illustrates a file system repair module, according to one embodiment of the present invention.

FIG. 2 illustrates a file system that includes a metadata repair module 130. The file system includes a metadata repair module 130 and metadata change tracking module 220, which accesses a change log 250 that stores information identifying changes that have been or will be made to the file system.

Metadata change tracking module 220 is configured to collect (e.g., from change log 250) information describing one or more changes that have been or are scheduled to be applied to the file system and to send that information to a reconstructed file system for application to a metasave image. In some embodiments, metadata change tracking module 220 also maintains change log 250.

Figure 3:
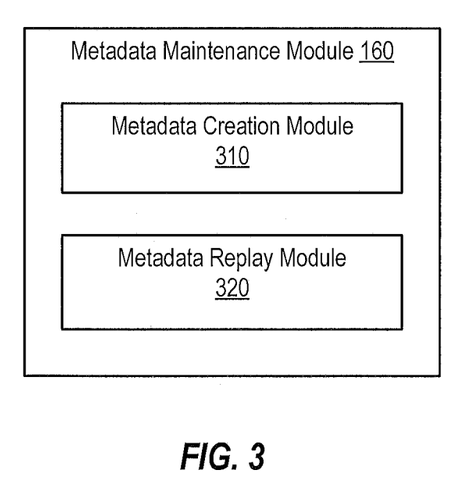
FIG. 3 illustrates a metadata maintenance module, according to one embodiment of the present invention.

Metadata repair module 130 begins operation whenever a file system repair operation is requested. Such an operation can be initiated by an application or administrator upon detection of a failure within a file system or at any other time. A file system repair operation replaces the file system's current metadata with the metadata saved in a metasave image at a prior point in time. FIG. 3 illustrates a metadata maintenance module 160. Metadata maintenance module 160 is typically implemented on a secondary computing device (e.g., other than the computing device on which the primary file system resides, in embodiments in which the metasave image(s) are maintained by a secondary computing device). In some cases (e.g., in embodiments in which the computing device implementing the primary file system maintains the metasave image(s)), metadata maintenance module 160 can also be implemented within the computing device on which the primary file system resides. Metadata maintenance module 160 helps to maintain one or more metasave images of the metadata blocks of a primary file system. As shown, metadata maintenance module 160 includes a metadata creation module 310 and a metadata replay module 320.

Metadata creation module 310 receives a metasave image describing a file system that exists at a primary computing device. This metasave image describes the metadata blocks of such a file system at a point in time, including the location and contents of each of the metadata blocks. Using this information, metadata creation module 310 recreates a copy of the file system, referred to as a reconstructed file system, on the second computing device. This reconstructed file system includes only metadata, and does not include any of the data of the primary file system.

Metadata replay module 320 replays changes to the metadata blocks of the primary file system on the previous most recent metasave image to generate a new most recent metasave image. The changes performed on metadata blocks of the primary file system can be identified by the change information generated by the primary computing device. Change information can be described, for example, within a log, a list, or a journal maintained within the primary computing device. These changes can be received by metadata replay module 320 after a certain time period elapses or after a certain number of changes are made to the primary file system. Alternatively, metadata replay module 320 can be configured to request the changes from the primary file system once per period or in response to other predefined circumstances.

Once change information is received by metadata replay module 320, the corresponding metadata blocks can be updated. To update a metadata block, the log, list, or journal of changes is replayed on the most recent metasave image to reflect the changes. Once the change information is applied to the metasave image, the resulting metadata blocks can be stored as an updated metasave image with an associated timestamp that describes when the updated metasave image was created.

Figure 4:
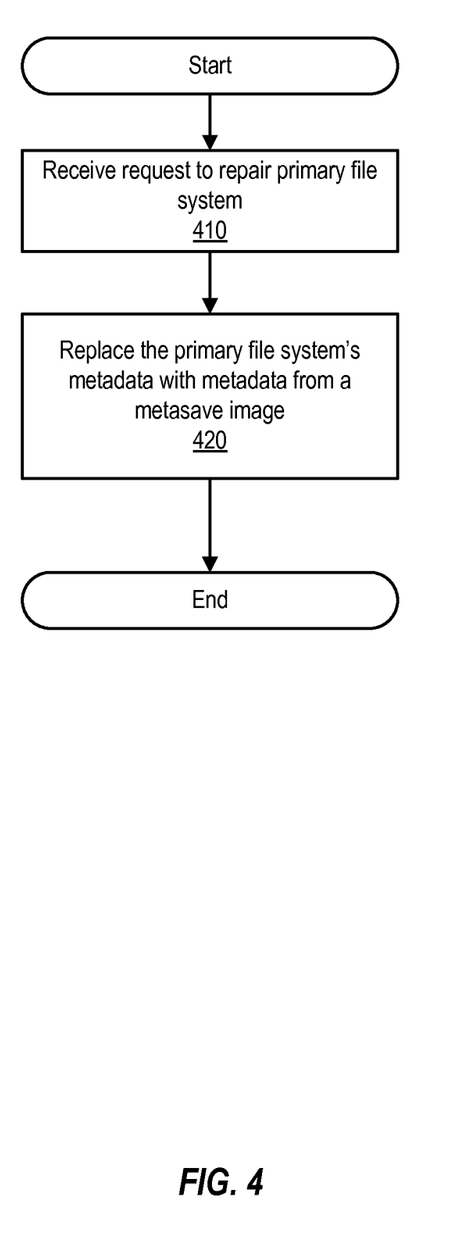
FIG. 4 is a flowchart illustrating an example of a process for repairing file systems, according to one embodiment of the present invention.

FIG. 4 is a flowchart illustrating an example of a process for repairing a file system, as implemented by a metadata repair module (e.g., such as metadata repair module 130 of FIG. 2). The process begins at 410 where a request to perform a file system repair operation is received. Such a request can be generated in response to detection of an error in a file system (e.g., by an application or administrator). Such an error can occur due to hardware, software, or user failures.

At 420, metadata stored in a metasave image, which is a point-in-time copy of the file system's metadata, is used to replace the file system's existing metadata with the saved metadata. The metasave image includes information identifying each metadata block and its location within the file system. This allows the metadata repair module to appropriately modify, add, and remove metadata blocks as needed when performing the replacement.

Figure 5:
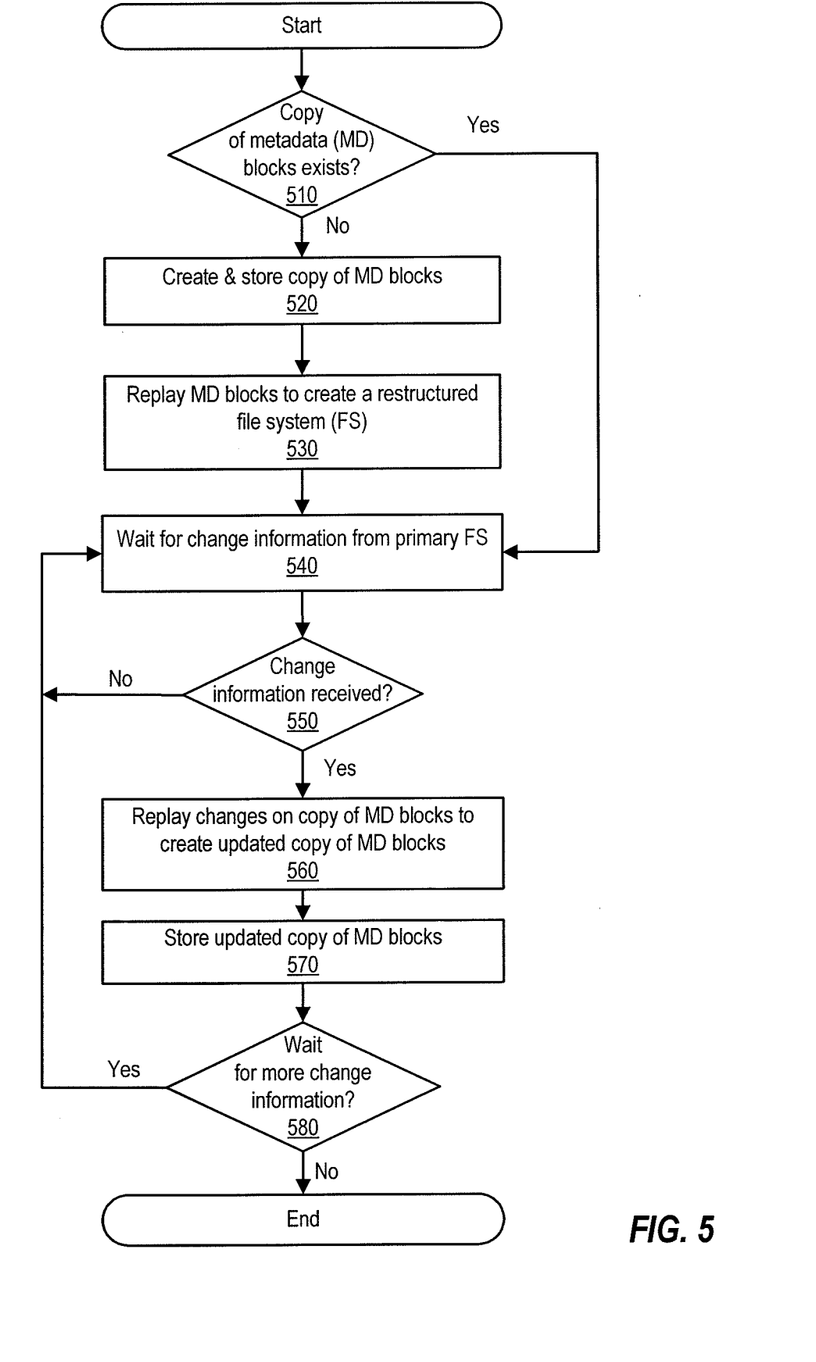
FIG. 5 is a flowchart illustrating an example of a process for creating and maintaining a consistent and non-corrupt copy of a file system metadata, according to one embodiment of the present invention.

FIG. 5 is a flowchart illustrating an example of a process for creating and maintaining non-damaged copies of metadata blocks, as implemented by a metadata maintenance module (e.g., such as metadata maintenance module 160 of FIG. 3). The process begins at 510, where a determination is first made as to whether a copy (e.g., a metasave image) of the metadata blocks within a primary file system already exists.

If a metasave image does not exist, the process continues to 520. At 520, a copy of all the metadata blocks of the primary file system is created and stored. The process continues at 530 where the metadata blocks are replayed to create a reconstructed file system (e.g., a file system with pure metadata, but no actual data, that mirrors the primary file system) within the secondary computing device.

At 540, the metadata maintenance module waits for change information to be received from the primary file system. This change information reflects the changes made to the primary file system since the last time the metadata block was updated or created by the metadata maintenance module. A determination is then made at 550 as to whether change information has been received from the primary file system. If no change information has been received, the metadata maintenance module waits for change information to be received from the primary file system.

Alternatively, if change information has been received by the metadata maintenance module, the change information received is replayed on the last copy of the metadata block to overwrite the previous copy of the metadata block content at 560 (alternatively, the change information can be replayed by removing or adding a metadata block to the metasave image). The resulting metadata block is now an updated metadata block and can be stored as such at 570. The process the continues to 580, where a determination is made to whether the metadata maintenance module will continue waiting for more change information.

A metadata maintenance module may continue waiting for the next round of change information in order to continue updating copies of the stored metadata block. In this case, the process returns to 540, where the metadata maintenance module awaits change information from a primary file system. Alternatively, if at 580, a determination is made that the metadata maintenance module will not continue waiting for the next round of change information (e.g., perhaps because a replacement of metadata blocks has just occurred), the process then ends.

Figure 6:
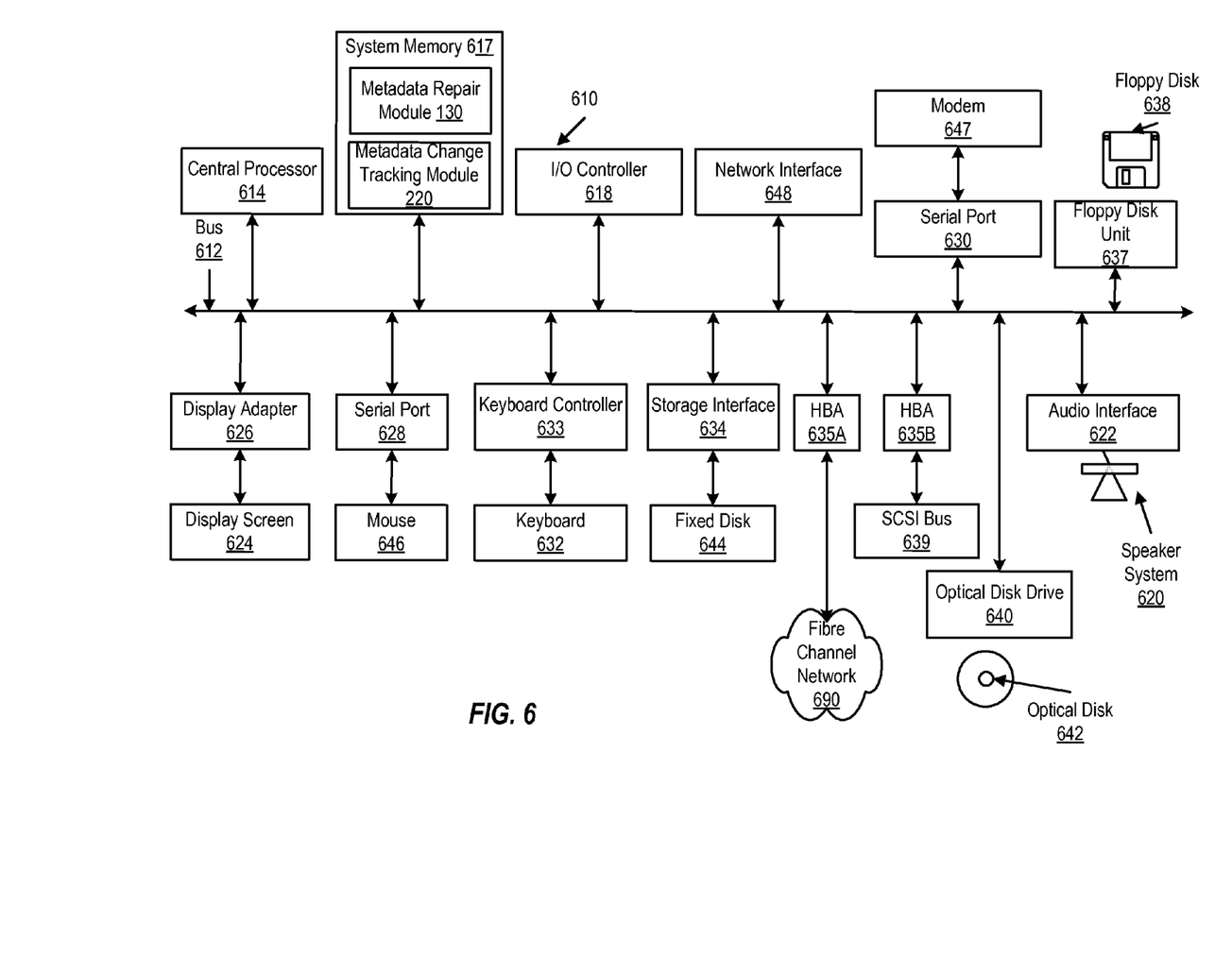
FIG. 6 is a block diagram of a computing system, according to one embodiment of the present invention.

FIG. 6 is a block diagram of a computing system suitable for repairing file systems, as described above. Computer system 610 includes a bus 612 which interconnects major subsystems of computer system 610, such as a central processor 614, a system memory 617 (typically RAM, but which can also include ROM, flash RAM, or the like, and which can also include software such as metadata repair module 130 and metadata change tracking module 220), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk unit 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which can include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer-readable medium, such as a hard disk drive (e.g., fixed disk 644), an optical drive (e.g., optical disk drive 640), a floppy disk unit 637, or other storage medium. Additionally, applications can be in the form of electronic signals modulated in accordance with the application and data communication technology when accessed via modem 647 or network interface 648.

Storage interface 634, as with the other storage interfaces of computer system 610, can connect to a standard computer-readable medium for storage and/or retrieval of information, such as a fixed disk drive 644. Fixed disk drive 644 can be a part of computer system 610 or can be separate and accessed through other interface systems. Modem 647 can provide a direct connection to a remote server via a telephone link or to the Internet via an internet service provider (ISP). Network interface 648 can provide a direct connection to a remote server via a direct network link to the Internet via a POP (point of presence). Network interface 648 can provide such connection using wireless techniques, including digital cellular telephone connection, Cellular Digital Packet Data (CDPD) connection, digital satellite data connection or the like.

Many other devices or subsystems (not shown) can be connected in a similar manner (e.g., document scanners, digital cameras, and so on). Conversely, all of the devices shown in FIG. 6 need not be present to practice the present invention. The devices and subsystems can be interconnected in different ways from that shown in FIG. 6. The operation of a computer system is readily known in the art and is not discussed in detail in this application. Code to implement the present invention can be stored in computer-readable storage media such as one or more of system memory 617, fixed disk 644, optical disk 642, or floppy disk 638. The operating system provided on computer system 610 can be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention can include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
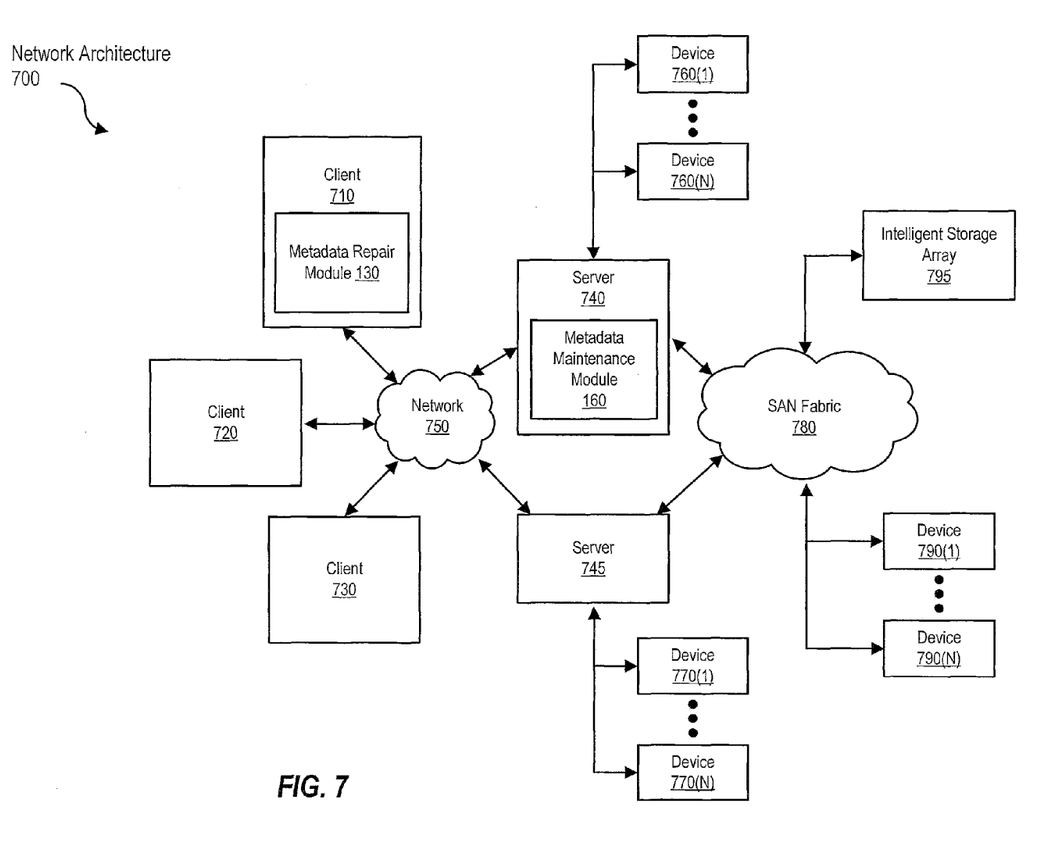
FIG. 7 is a block diagram of a network system, according to one embodiment of the present invention.

FIG. 7 is a block diagram of a network system 700 in which client systems 710, 720, and 730 and servers 740 and 745 can be coupled to a network 750. Client systems 710, 720, and 730 generally represent any type or form of computing device or system, such as computing system 610 in FIG. 6.

Similarly, servers 740 and 745 generally represent computing devices or systems, such as application servers or database servers, configured to provide various database services and/or run certain software applications, such as computing system 610 in FIG. 6. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 can include a metadata repair module 130, as shown in FIG. 2, and/or a metadata maintenance module 160, as shown in FIG. 3.

As illustrated in FIG. 7, one or more storage devices 760(1)-(N) can be directly attached to server 740. Similarly, one or more storage devices 770(1)-(N) can be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) can represent network-attached storage (NAS) devices configured to communicate with servers 740 and 745 using various protocols, such as Network File System (NFS), Server Message Block (SMB), or Common Internet File System (CIFS).

Servers 740 and 745 can also be connected to a storage area network (SAN) fabric 780. SAN fabric 780 generally represents any type or form of computer network or architecture capable of facilitating communication between multiple storage devices. SAN fabric 780 can facilitate communication between servers 740 and 745 and a plurality of storage devices 790(1)-(N) and/or an intelligent storage array 795. SAN fabric 780 can also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to computing system 610 of FIG. 6, a communication interface can be used to provide connectivity between each client system 710, 720, and 730 and network 750. Client systems 710, 720, and 730 can be able to access information on server 740 or 745 using, for example, a web browser or other client software. Such software can allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the embodiments disclosed herein can also be encoded as a computer program, stored in server 740, run by server 745, and distributed to client systems 710, 720, and 730 over network 750.

In some examples, all or a portion of the computing devices in FIGS. 1, 2, 3, 6, and 7 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, a metadata repair module 130 in FIG. 2 can transform a file system from a potentially erroneous state by replacing the metadata blocks of the file system with the metadata blocks stored in a point-in-time copy of the file system's metadata.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   maintaining a set of metasave images for an original file system, wherein
      each of the metasave images in the set of metasave images comprises a copy of metadata included in the original file system at a particular point-in-time,
      the each of the metasave images in the set of metasave images excludes file system data described by the metadata,
      the each of the metasave images in the set of metasave images represents a plurality of changes made to the metadata during a given time period,
      the given time period begins when a previous metasave image is generated and continues until a log of changes to the metadata reaches a certain capacity, and
      the log of changes reaching the certain capacity triggers creation of the each of the metasave images;
   receiving a request to repair the original file system, wherein
      the original file system comprises the file system data,
      the original file system further comprises a current set of metadata at a time that the request is received,
      the current set of metadata describes the file system data within the original file system, and
      the current set of metadata is potentially damaged at the time that the request is received;
   in response to the request, selecting a metasave image from the set of metasave images, wherein
      the request specifies a point-in-time, and
      the selecting is based on the point-in-time;
   accessing the metasave image, wherein
      the metasave image comprises the particular point-in-time copy of metadata included in the original file system at the particular point-in-time and information identifying a location of each block of metadata in the metasave image; and
   repairing the original file system by replacing the current set of metadata with the metadata included in the metasave image, wherein
      the receiving, the accessing, and the replacing are performed by a computing device implementing a file system repair module, and
      the replacing is performed instead of performing an operation to analyze each metadata item of the current set of metadata that is potentially damaged and repair any metadata items that comprise an error.

2. The method of claim 1, further comprising:
   generating the metasave image.

3. The method of claim 2, further comprising:
   generating information identifying one or more changes to the original file system, wherein
      the one or more changes occur subsequent to the generating the metasave image.

4. The method of claim 3, further comprising:
   recording the one or more changes to the original file system in the log of changes.

5. The method of claim 3, further comprising:
   generating an updated metasave image by replaying the one or more changes to
      the original file system on the metasave image, wherein
      the updated metasave image is generated based upon a set of criteria.

6. The method of claim 1, further comprising:
   generating the each of the metasave images at the particular point-in-time.

7. The method of claim 1, wherein
   the replacing comprises removing a metadata block from the current set of metadata in response to detecting that the metadata block is not included in the metasave image.

8. A computer readable storage medium comprising program instructions executable to:
   maintain a set of metasave images for an original file system, wherein
      each of the metasave images in the set of metasave images comprises a copy of metadata included in the original file system at a particular point-in-time,
      the each of the metasave images in the set of metasave images excludes file system data described by the metadata,
      the each of the metasave images in the set of metasave images represents a plurality of changes made to the metadata during a given time period,
      the given time period begins when a previous metasave image is generated and continues until a log of changes to the metadata reaches a certain capacity, and
      the log of changes reaching the certain capacity triggers creation of the each of the metasave images;
   receive a request to repair the original file system, wherein
      the original file system comprises the file system data,
      the original file system further comprises a current set of metadata at a time that the request is received,
      the current set of metadata describes the file system data within the original file system, and
      the current set of metadata is potentially damaged at the time that the request is received;
   select a metasave image from the set of metasave images, in response to the request, wherein
      the request specifies a point-in-time, and
      the selecting is based on the point-in-time;
   access the metasave image, wherein
      the metasave image comprises the particular point-in-time copy of metadata included in the original file system at the particular point-in-time and information identifying a location of each block of metadata in the metasave image; and
   repair the original file system by replacing the current set of metadata with the metadata included in the metasave image, wherein
      the replacing is performed instead of performing an operation to analyze each metadata item of the current set of metadata that is potentially damaged and repair any metadata items that comprise an error.

9. The computer readable storage medium of claim 8, wherein the program instructions are further executable to:
   generate the metasave image.

10. The computer readable storage medium of claim 9, wherein the program instructions are further executable to:
generate information identifying one or more changes to the original file system, wherein
the one or more changes occur subsequent to the generation of the metasave image.

11. The computer readable storage medium of claim 10, wherein the program instructions are further executable to:
record the one or more changes in the log of changes.

12. The computer readable storage medium of claim 10, wherein the program instructions are further executable to:
generate an updated metasave image by replaying the one or more changes to the original file system on the metasave image, wherein
the updated metasave image is generated based upon a set of criteria.

13. The computer readable storage medium of claim 8, wherein the program instructions are further executable to:
generate the each of the metasave images at the particular point-in-time.

14. The computer readable storage medium of claim 8, wherein the program instructions are further executable to:
remove a metadata block from the current set of metadata in response to detecting that the metadata block is not included in the metasave image.

15. A system comprising:
one or more processors; and
memory coupled to the one or more processors, wherein the memory stores program instructions executable by the one or more processors to:
maintain a set of metasave images for an original file system, wherein
each of the metasave images in the set of metasave images comprises a copy of metadata included in the original file system at a particular point-in-time,
the each of the metasave images in the set of metasave images excludes file system data described by the metadata,
the each of the metasave images in the set of metasave images represents a plurality of changes made to the metadata during a given time period,
the given time period begins when a previous metasave image is generated and continues until a log of changes to the metadata reaches a certain capacity, and
the log of changes reaching the certain capacity triggers creation of the each of the metasave images,
receive a request to repair the original file system, wherein
the original file system comprises the file system data,
the original file system further comprises a current set of metadata at a time that the request is received,
the current set of metadata describes the file system data within the original file system, and
the current set of metadata is potentially damaged at the time that the request is received,
select a metasave image from the set of metasave images, in response to
the request, wherein
the request specifies a point-in-time, and
the selecting is based on the point-in-time,
access the metasave image, wherein
the metasave image comprises the point-in-time copy of metadata included in the original file system at the point-in-time and information identifying a location of each block of metadata in the metasave image, and
repair the original file system by replacing the current set of metadata with the metadata included in the metasave image, wherein
the replacing is performed instead of performing an operation to analyze each metadata item of the current set of metadata that is potentially damaged and repair any metadata items that comprise an error.

16. The system of claim 15, wherein the program instructions are further executable to:
generate the metasave image.

17. The system of claim 16, wherein the program instructions are further executable to:
generate information identifying one or more changes to the original file system, wherein
the one or more changes occur subsequent to the generation of the metasave image.

18. The system of claim 17, wherein the program instructions are further executable to:
generate an updated metasave image by replaying the one or more changes to the original file system on the metasave image, wherein
the updated metasave image is generated based upon a set of criteria.

19. The system of claim 15, wherein the program instructions are further executable to:
generate the each of the metasave images at the particular point-in-time.

20. The system of claim 15, wherein the program instructions are further executable to:
remove a metadata block from the current set of metadata in response to detecting that the metadata block is not included in the metasave image.

21. The method of claim 1, wherein
the repairing allows the file system data within the original file system to be accessed using the replaced metadata.

* * * * *